US008642668B2

(12) United States Patent
Sasaki et al.

(10) Patent No.: US 8,642,668 B2
(45) Date of Patent: Feb. 4, 2014

(54) POLYMER-DISPERSED POLYOL AND PROCESS FOR PRODUCING FLEXIBLE POLYURETHANE FOAM

(75) Inventors: Takayuki Sasaki, Kamisu (JP); Yasuyuki Sasao, Kamisu (JP); Naohiro Kumagai, Kamisu (JP); Chitoshi Suzuki, Kamisu (JP); Shigeru Ikai, Kamisu (JP)

(73) Assignee: Asahi Glass Company, Limited, Tokyo (JP)

( * ) Notice: Subject to any disclaimer, the term of this patent is extended or adjusted under 35 U.S.C. 154(b) by 332 days.

(21) Appl. No.: 12/644,043

(22) Filed: Dec. 22, 2009

(65) Prior Publication Data

US 2010/0096768 A1 Apr. 22, 2010

(30) Foreign Application Priority Data

Jun. 22, 2007 (JP) .................. 2007-165014

(51) Int. Cl.
*C08J 9/00* (2006.01)
(52) U.S. Cl.
USPC ........................................ 521/134; 264/54
(58) Field of Classification Search
USPC ........................................... 521/134; 264/54
See application file for complete search history.

(56) References Cited

U.S. PATENT DOCUMENTS

| 5,093,380 | A | * | 3/1992 | Takeyasu et al. | .............. 521/131 |
| 5,096,993 | A | | 3/1992 | Smith et al. | |
| 6,815,467 | B2 | | 11/2004 | Toyota et al. | |
| 7,635,724 | B2 | | 12/2009 | Sasaki et al. | |
| 7,691,914 | B2 | * | 4/2010 | Abraham et al. | .............. 521/172 |
| 2003/0100623 | A1 | * | 5/2003 | Kaku et al. | ..................... 521/155 |
| 2006/0004233 | A1 | | 1/2006 | Suzuki et al. | |
| 2006/0229375 | A1 | * | 10/2006 | Hsiao et al. | ................... 521/172 |
| 2006/0264524 | A1 | * | 11/2006 | Abraham et al. | .............. 521/172 |
| 2008/0176970 | A1 | | 7/2008 | Sasaki et al. | |
| 2009/0239964 | A1 | | 9/2009 | Sasaki et al. | |
| 2009/0270520 | A1 | | 10/2009 | Sasaki et al. | |

FOREIGN PATENT DOCUMENTS

| JP | 05-059134 | 3/1993 |
| JP | 09-031142 | 2/1997 |
| JP | 2000-355614 | 12/2000 |
| JP | 2001-323155 | 11/2001 |
| JP | 2007-146163 | 6/2007 |
| WO | 2006-065345 | 6/2006 |
| WO | 2007-020904 | 2/2007 |
| WO | 2008-038596 | 4/2008 |
| WO | 2008-038678 | 4/2008 |
| WO | 2008-123323 | 10/2008 |

OTHER PUBLICATIONS

U.S. Appl. No. 12/732,778, filed Mar. 26, 2010, Sasaki, et al.

\* cited by examiner

*Primary Examiner* — Amjad Abraham
(74) *Attorney, Agent, or Firm* — Oblon, Spivak, McClelland, Maier & Neustadt, L.L.P.

(57) ABSTRACT

To provide a process for producing a flexible polyurethane foam having a higher biomass degree than a conventional flexible polyurethane foam and excellent in foam physical properties and its appearance.

A polymer-dispersed polyol obtained by polymerizing a vinyl monomer in the presence of the following polyol (a1) derived from a natural fat/oil and/or the following polyoxyalkylene polyol (a2) is used: Polyol (a1) derived from a natural fat/oil: a polyol derived from a natural fat/oil, which is obtained by providing a natural fat/oil with hydroxy groups by chemical reaction, and which has a hydroxy value of from 20 to 250 mgKOH/g and a molecular weight distribution of at least 1.2; Polyoxyalkylene polyol (a2): a polyoxyalkylene polyol which is produced by ring-opening polymerization of an alkylene oxide (c) with the polyol (a1) derived from a natural fat/oil in the presence of at least one polymerization catalyst (b) selected from the group consisting of a coordination anionic polymerization catalyst and a cationic polymerization catalyst.

16 Claims, No Drawings

US 8,642,668 B2

POLYMER-DISPERSED POLYOL AND PROCESS FOR PRODUCING FLEXIBLE POLYURETHANE FOAM

TECHNICAL FIELD

The present invention relates to a polymer-dispersed polyol using a raw material derived from a natural fat/oil, and a process for producing a flexible polyurethane foam using the polymer-dispersed polyol.

BACKGROUND ART

A flexible polyurethane foam is produced by reacting a polyol and a polyisocyanate in the presence of e.g. a catalyst and a blowing agent. As the polyol, e.g. a polyoxyalkylene polyol produced by ring-opening polymerization of an alkylene oxide such as ethylene oxide or propylene oxide to an initiator having an active hydrogen atom, or a polymer-dispersed polyol obtained by polymerizing a vinyl monomer in the presence of the polyoxyalkylene polyol, is used. The alkylene oxide and the vinyl monomer accounting for a large part of initiators which are raw materials of the polyol, are compounds derived from petroleum.

In recent years, in consideration of environment, there has been a demand to increase the proportion of a non-petroleum type raw material in a polyol (hereinafter referred to as the biomass degree).

As the polyol using a non-petroleum type raw material, the following polymer-dispersed polyols are proposed.

(1) A polymer-dispersed polyol obtained by polymerizing a reaction mixture containing a vinyl monomer, a polyol and a modified hydroxy group-containing compound obtained by reacting castor oil with a polyol (Patent Document 1).

(2) A polymer-dispersed polyol having polymer particles obtained by polymerizing a vinyl monomer dispersed in a polyol containing a polyol derived from a plant (castor oil) and a low-monool-content polyol (Patent Document 2).

(3) A polymer-dispersed polyol having polymer particles dispersed in a polyolester polyol having hydroxymethyl groups, induced from a fatty acid or a fatty acid ester derived from a vegetable oil plant (Patent Document 3).

However, since the polymer-dispersed polyols in (1) and (2) contain polyols derived from petroleum in a large amount, the biomass degrees are not sufficiently high. Further, if the proportion of castor oil, which is a non-petroleum type raw material, is increased, it is not possible to produce a flexible polyurethane foam excellent in foam physical properties and its appearance. With respect to the polymer-dispersed polyol in (3), the production process of a polyester polyol having hydroxymethyl groups is long, whereby the cost tends to be high.

Patent Document 1: JP-A-9-31142
Patent Document 2: WO2007/020904
Patent Document 3: WO2006/065345

DISCLOSURE OF THE INVENTION

Object to be Accomplished by the Invention

The present invention provides a polymer-dispersed polyol with which a flexible polyurethane foam excellent in foam physical properties and its appearance even with a higher biomass degree than a conventional polymer-dispersed polyol can be produced, and a process for producing a flexible polyurethane foam having a higher biomass degree than a conventional flexible polyurethane foam and excellent in foam physical properties and its appearance.

Means to Accomplish the Object

The polymer-dispersed polyol of the present invention is characterized by being obtained by polymerizing a vinyl monomer in the presence of the following polyol (a1) derived from a natural fat/oil and/or the following polyoxyalkylene polyol (a2).

Polyol (a1) derived from a natural fat/oil: a polyol derived from a natural fat/oil, which is obtained by providing a natural fat/oil with hydroxy groups by chemical reaction, and which has a hydroxy value of from 20 to 250 mgKOH/g and a molecular weight distribution of at least 1.2;

Polyoxyalkylene polyol (a2): a polyoxyalkylene polyol which is produced by ring-opening polymerization of an alkylene oxide (c) with the polyol (a1) derived from a natural fat/oil in the presence of at least one polymerization catalyst (b) selected from the group consisting of a coordination anionic polymerization catalyst and a cationic polymerization catalyst.

The polyol (a1) derived from a natural fat/oil is preferably one obtained by blowing air or oxygen in a natural fat/oil to cause oxidative crosslinking between unsaturated double bonds of the natural fat/oil and at the same time, to have hydroxy groups provided, or one obtained by epoxidizing unsaturated double bonds of a natural fat/oil by having an oxidizing agent acted thereto, followed by ring-opening in the presence of an active hydrogen compound to have hydroxy groups provided.

The natural fat/oil preferably has an iodine value of from 50 to 200.

The method for producing a flexible polyurethane foam of the present invention is characterized by reacting a polyol (A) containing the polymer-dispersed polyol (A1) of the present invention and a polyisocyanate (B) in the presence of a catalyst (C) and a blowing agent (D).

The polyol (A) preferably further contains a polyoxyalkylene polyol (A2) having an average number of hydroxy groups of from 2 to 8 and a hydroxy value of from 20 to 160 mgKOH/g.

The polyol (A) preferably further contains the polyoxyalkylene polyol (a2).

Effects of Invention

According to the polymer-dispersed polyol of the present invention, it is possible to produce a flexible polyurethane foam excellent in foam physical properties and its appearance even with a higher biomass degree than a conventional polymer-dispersed polyol.

According to the process for producing a flexible polyurethane foam of the present invention, it is possible to produce a flexible polyurethane foam having a higher biomass degree than the one of a conventional flexible polyurethane foam and excellent in foam physical properties and its appearance.

BEST MODE FOR CARRYING OUT THE INVENTION

<Polymer-Dispersed Polyol (A1)>

The polymer-dispersed polyol is a polyol wherein polymer particles (dispersoid) obtained by polymerizing a vinyl monomer are dispersed in a base polyol (dispersion medium).

The polymer-dispersed polyol (A1) of the present invention is obtained by polymerizing a vinyl monomer in the presence of a polyol (a1) derived from a natural fat/oil and/or a polyoxyalkylene polyol (a2).

(Polyol (a1) Derived from a Natural Fat/Oil)

The polyol (a1) derived from a natural fat/oil is the following polymer obtained by providing a natural fat/oil having no hydroxy groups with hydroxy groups by chemical reaction.

The natural fat/oil having no hydroxy groups means a natural fat/oil having no hydroxy groups contained slightly as impurities or hydroxy groups obtained by oxidization of double bounds of a hydrolyzate and/or of an unsaturated aliphatic acid obtained by unexpected natural oxidization.

The polyol (a1) derived from a natural fat/oil is preferably one obtained by blowing air or oxygen in a natural fat/oil to cause oxidative crosslinking between unsaturated double bonds and at the same time, to have hydroxy groups provided, or one obtained by epoxidizing unsaturated double bonds of a natural fat/oil by having an oxidizing agent acted thereto, followed by ring-opening in the presence of an active hydrogen compound to have hydroxy groups provided.

The natural fat/oil may, for example, be a natural fat/oil having no hydroxy groups i.e. natural fat/oil other than castor oil and purified phytosterol. Further, since phytosterol is a sterol derived from a plant and is slightly contained in vegetable oil such as soybean oil or canola oil, inclusion in such a range is acceptable.

The natural fat/oil is preferably one containing an aliphatic acid glyceride having unsaturated double bonds. The natural fat/oil may, for example, be linseed oil, safflower oil, soybean oil, tung oil, poppy oil, canola oil, sesame oil, rice oil, camellia oil, olive oil, tall oil, palm oil, cotton oil, corn oil, fish oil, beef tallow or lard.

The natural fat/oil (it may be used alone or in combination as a mixture of two or more of them) has an iodine value of preferably from 50 to 200, more preferably from 100 to 150 by the measurement in accordance with JIS K 0070. When the iodine value is at least 50, the reactivity when the unsaturated double bonds are provided with hydroxy groups tends to be high, and more hydroxy groups can be introduced.

The natural fat/oil having an iodine value of at least 50 may, for example, be linseed oil, safflower oil, soybean oil, tung oil, poppy oil, canola oil, sesame oil, rice oil, camellia oil, olive oil, tall oil, cotton oil, corn oil, fish oil or lard.

The natural fat/oil having an iodine value of at least 100 may, for example, be linseed oil, safflower oil, soybean oil, tung oil, poppy oil, canola oil, sesame oil, rice oil, tall oil, cotton oil, corn oil or fish oil, and soybean oil is preferred since it is inexpensive.

The polyol (a1) derived from a natural fat/oil has a hydroxy value of from 20 to 250 mgKOH/g, preferably from 30 to 200 mgKOH/g. The castor oil usually has a hydroxy value of from 155 to 177 mgKOH/g. A natural fat/oil other than castor oil and phytosterol has a hydroxy value of at most 10 mgKOH/g since it has no hydroxy groups. By providing the natural fat/oil having no hydroxy groups with hydroxy groups by chemical reaction, it is possible to adjust the hydroxy value to from 20 to 250 mgKOH/g.

When the polyol (a1) derived from a natural fat/oil has a hydroxy value of at least 20 mgKOH/g, the crosslinking reactivity tends to be high, whereby sufficient foam physical properties can be obtained. When the polyol (a1) derived from a natural fat/oil has a hydroxy value of at most 250 mgKOH/g, the flexibility of the obtained flexible polyurethane foam tends to be excellent and the biomass degree tends to be high.

The polyol (a1) derived from a natural fat/oil has a molecular weight distribution of at least 1.2. Castor oil or phytosterol has a molecular weight distribution of at most 1.1. However, if a natural fat/oil other than castor oil and phytosterol is provided with hydroxy groups by chemical reaction, the molecular weight distribution becomes at least 1.2, and making it smaller than that is difficult with current technologies.

The polyol (a1) derived from a natural fat/oil has a molecular weight distribution of preferably at most 20, more preferably at most 15, from the viewpoint of flowability of the polyol. The polyol (a1) derived from a natural fat/oil has a molecular weight distribution of more preferably from 1.2 to 15.

The molecular weight distribution is a ratio (Mw/Mn) of a weight average molecular weight (Mw) to a number average molecular weight (Mn).

The polyol (a1) derived from a natural fat/oil has a weight average molecular weight (Mw) of preferably at least 1,500, more preferably at least 1,700, further preferably at least 2,000, from the viewpoint of the compatibility or foam physical properties of the polyol.

The polyol (a1) derived from a natural fat/oil has a weight average molecular weight (Mw) of preferably at most 500,000, more preferably at most 100,000, from the viewpoint of flowability of the polyol.

The number average molecular weight (Mn) and the weight average molecular weight (Mw) are molecular weights calculated as polystyrene, measured by using a commercially available gel permeation chromatography (GPC) measuring device.

A method for producing the polyol (a1) derived from a natural fat/oil may, for example, be the following methods (i) to (v), and the method (i) or (ii) is preferred from the viewpoint of the cost.

(i) A method wherein air or oxygen is blown in a natural fat/oil.

(ii) A method wherein after a natural fat/oil is epoxidized, the epoxy rings are ring-opened to have hydroxy groups provided.

(iii) A method wherein after unsaturated double bonds of a natural fat/oil are reacted with carbon monoxide and hydrogen in the presence of a special metal catalyst to form carbonyl, hydrogen is further reacted therewith to have primary hydroxy groups provided.

(iv) A method wherein after the method (i), the method (ii) or (iii) is carried out to provide remained double bonds with hydroxy groups.

(v) A method wherein after the method (ii) or (iii), the method (i) is carried out to provide remained double bonds with hydroxy groups.

Method (i):

This is a method wherein by blowing air or oxygen in a natural fat/oil to cause oxidative crosslinking between unsaturated double bonds and at the same time, to have hydroxy groups provided. Further, a polyhydric alcohol may be introduced by a transesterification reaction.

In method (i), depending on the type of a natural oil/fat to be used as a raw material and the oxidation state during blowing, the molecular weight and the hydroxy value of the polyol (a1) derived from a natural fat/oil may be adjusted.

In a case where soybean oil is used as a raw material in method (i), the weight average molecular weight (Mw) of the polyol (a1) derived from a natural fat/oil is usually at least 1,500, preferably from 1,700 to 500,000; more preferably from 2,000 to 100,000. When the weight average molecular weight (Mw) of the polyol (a1) derived from a natural fat/oil is at least 1,500, oxidative crosslinking and hydroxy groups are sufficiently formed, and crosslinkability tends to be good.

When the weight average molecular weight (Mw) of the polyol (a1) derived from a natural fat/oil is at most 500,000, the flowability of the polyol tends to be good.

In a case where soybean oil is used as a raw material in method (i), the molecular weight distribution (Mw/Mn) of the polyol (a1) derived from a natural fat/oil is usually at least 1.2, preferably from 1.5 to 15.

The commercial products of the polyol (a1) derived from a natural fat/oil (aerated soybean oil) produced by method (i) using soybean oil as a raw material may, for example, be Soyol series manufactured by Urethane Soy Systems Company.

Method (ii):

This is a method wherein unsaturated double bonds of a natural fat/oil are epoxidized by having an oxidizing agent acted thereto, followed by ring-opening in the presence of an active hydrogen compound to have hydroxy groups provided by using a cationic polymerization catalyst.

As the oxidizing agent, a peroxide such as peracetic acid is used.

As the cationic polymerization catalyst, boron trifluoride diethyl etherate ($BF_3Et_2O$) may be mentioned.

As the active hydrogen compound, the following compounds are mentioned.

Water, a monohydric alcohol, a polyhydric alcohol, a saccharide, a polyoxyalkylene monool, a polyoxyalkylene polyol, a polyester polyol, a polyetherester polyol, a monovalent carboxylic acid, a multivalent carboxylic acid, hydroxycarboxylic acid and/or its condensate, a primary amine, a secondary amine, hydroxy amine, alkanol amine may, for example, be mentioned. From the viewpoint of its low cost and easiness of handling, water and/or a monohydric alcohol are preferred, and water and/or methanol are particularly preferred.

The reaction to provide hydroxy groups by ring-opening the epoxidized soybean oil, can be carried out by a process wherein after dropwisely adding the epoxidized soybean oil is dropwise added to a mixed solution of the cationic polymerization catalyst and the active hydrogen compound, the cationic polymerization catalyst is removed by an adsorption filtration.

The commercial products of the epoxidized soybean oil may, for example, be ADK CIZER O-130P manufactured by ADEKA Corporation.

In method (ii), it is possible to adjust the hydroxy value of the polyol (a1) derived from a natural fat/oil by the epoxy equivalent of an epoxidized natural fat/oil. It is possible to adjust the epoxy equivalent of an epoxidized natural fat/oil by e.g. the iodine value of a natural fat/oil used as a raw material, the amount of the oxidizing agent to the iodine value and reactivity.

In method (ii), it is possible to adjust the molecular weight of the polyol (a1) derived from a natural fat/oil by the amount of the active hydrogen compound during providing hydroxy groups. If the amount of the active hydrogen compound is remarkably large, it is possible to make the molecular weight small, however, the reactivity tends to be bad and the cost tends to be high. Further, as soon as the molecular weight distribution becomes less than 1.2, drawbacks occur such that the molecular weight between crosslinking points is also decreased and the flexibility of the obtained flexible polyurethane foam is decreased. If the amount of the active hydrogen compound is too small, a ring-opening polymerization reaction of the epoxidized natural fat/oil may proceed, whereby the molecular weight may rapidly be increased, and the molecules may be gelled.

In a case where epoxidized soybean oil is used as a raw material in method (ii), the weight average molecular weight (Mw) of the polyol (a1) derived from a natural fat/oil is usually at least 1,500, preferably from 1,800 to 20,000.

In a case where epoxidized soybean oil is used as a raw material in method (ii), the molecular weight distribution (Mw/Mn) of the polyol (a1) derived from a natural fat/oil is usually at least 1.1, preferably from 1.2 to 8.

(Polyoxyalkylene Polyol (a2))

The polyoxyalkylene polyol (a2) a polyoxyalkylene polyol produced by ring-opening polymerization of an alkylene oxide (c) with the polyol (a1) derived from a natural fat/oil in the presence of a polymerization catalyst (b).

The polymerization catalyst (b) may be at least one selected from a coordination anionic polymerization catalyst and a cationic polymerization catalyst, and the coordination anionic polymerization catalyst is preferred.

The coordination anionic polymerization catalyst may be a known coordination anionic polymerization catalyst and is preferably a double metal cyanide complex catalyst having an organic ligand (hereinafter the double metal cyanide complex catalyst having an organic ligand will be referred to as a DMC catalyst).

The DMC catalyst can be produced by a known production process (for example, a method disclosed in JP-A-2003-165836, JP-A-2005-15786, JP-A-7-196778 or JP-A-2000-513647).

The process for producing the DMC catalyst may, for example, be the following processes ($\alpha$) to ($\gamma$).

($\alpha$) A process wherein in an aqueous solution, an organic ligand is coordinated to a reaction product obtained by reacting a halogenated metal salt with an alkali metal cyanometalate, followed by separation of a solid component, and the separated solid component is further washed with an organic ligand aqueous solution.

($\beta$) A process wherein in the organic ligand aqueous solution, a reaction product (a solid component) obtained by reacting a halogenated metal salt with an alkali metal cyanometalate, is separated, and the separated solid component is further washed with the organic ligand aqueous solution.

($\gamma$) A process wherein in the process ($\alpha$) or ($\beta$), a DMC catalyst in a slurry form is prepared in such a manner that a cake (a solid component) obtained by washing and filtrating/separating the above reaction product, is redispersed in the organic ligand aqueous solution containing at most 3 mass % of a polyether compound based on the cake, followed by distillating a volatile component.

As the DMC catalyst, the DMC catalyst in a slurry form obtained by process ($\gamma$) is preferred from the viewpoint of its high reactivity and easiness of handling.

The polyether compound to be used in the process ($\gamma$) is preferably a polyether polyol or a polyether monool, and it is more preferably a polyether monool or a polyether polyol, which is produced by ring-opening polymerization of an alkylene oxide with an initiator (a polyhydric alcohol or a monoalcohol) by using an alkali catalyst or a cationic catalyst, and which has from 1 to 12 average hydroxy groups per molecule and has a weight average molecular weight of from 300 to 5,000.

As the DMC catalyst, a zinc hexacyanocobaltate complex having an organic ligand is preferred.

The organic ligand may, for example, be an alcohol, an ether, a ketone, an ester, an amine or an amide. Specifically, it may, for example, be tert-butyl alcohol, n-butyl alcohol, iso-butyl alcohol, tert-pentyl alcohol, iso-pentyl alcohol, N,N-dimethylacetamide, ethylene glycol mono-tert-butyl ether, ethylene glycol dimethyl ether (glyme), diethylene glycol dimethyl ether (diglyme), triethylene glycol dimethyl ether (triglyme), iso-propyl alcohol or a dioxane.

The dioxane may be 1,4-dioxane or 1,3-dioxane, and 1,4-dioxane is preferred.

Such organic ligands may be used alone or in combination as a mixture of two or more of them.

The organic ligand is preferably tert-butyl alcohol. Therefore, as the DMC catalyst, it is preferred to use a double metal cyanide complex catalyst having tert-butyl alcohol as at least one part of the organic ligand. Such a DMC catalyst provides high activity and it is thereby possible to produce a polyoxyalkylene polyol (a2) having a low total unsaturation value. Further, when a DMC catalyst having high activity is used, the amount of the polymerization catalyst can be reduced, whereby the polyether before purification has little remaining polymerization catalyst, and thus it is possible to further reduce the remaining polymerization catalyst in the polyol after purification.

The cationic polymerization catalyst may, for example, be lead tetrachloride, tin tetrachloride, titanium tetrachloride, aluminum trichloride, zinc chloride, vanadium trichloride, antimony trichloride, metal acetylacetonate, phosphorus pentafluoride, antimony pentafluoride, boron trifluoride, a boron trifluoride-coordinated compound (for example, boron trifluoride diethyl etherate, boron trifluoride dibutyl etherate, boron trifluoride dioxanate, boron trifluoride acetic anhydride or a boron trifluoride triethylamine complex compound); an inorganic acid (for example, perchloric acid, acetyl perchlorate or tert-butyl perchlorate); an organic acid (for example, hydroxyacetic acid, trichloroacetic acid, trifluoroacetic acid, p-toluene sulfonic acid or trifluoromethane sulfonic acid); a metal salt of an organic acid; a composite salt compound (for example, triethyloxonium tetrafluoroborate, triphenylmethyl hexafluoroantimonate, allyldiazonium hexafluorophosphate or allyldiazonium tetrafluoroborate); an alkyl metal salt (for example, diethylzinc, triethylaluminum or diethylaluminum chloride); heteropolyacid, isopolyacid; or an aluminum or a boron compound having at least one aromatic hydrocarbon group containing a fluorine atom or an aromatic hydrocarbon oxy group containing a fluorine atom.

Among them, preferred is $MoO_2$(diketonate)Cl, $MoO_2$(diketonate)$OSO_2CF_3$, trifluoromethanesulfonic acid, boron trifluoride, a boron trifluoride coordinated compound (for example, boron trifluoride diethyl etherate, boron trifluoride dibutyl etherate, boron trifluoride dioxanate, boron trifluoride acetic anhydrate or a boron trifluoride triethylamine complex compound) or an aluminum or a boron compound having at least one aromatic hydrocarbon group containing a fluorine atom or an aromatic hydrocarbon oxy group containing a fluorine atom.

The aromatic hydrocarbon group containing a fluorine atom may, for example, be pentafluorophenyl, tetrafluorophenyl, trifluorophenyl, 3,5-bis(trifluoromethyl)trifluorophenyl, 3,5-bis(trifluoromethyl)phenyl, β-perfluoronaphthyl and 2,2',2"-perfluorobiphenyl.

The aromatic hydrocarbon oxy group containing a fluorine atom is preferably a hydrocarbon oxy group having an oxygen atom bonded to the above aromatic hydrocarbon group containing a fluorine atom.

The aluminum or boron compound having at least one aromatic hydrocarbon group containing a fluorine atom or an aromatic hydrocarbon oxy group containing a fluorine atom, is preferably a boron compound or an aluminum compound as a Lewis acid, described in, for example, JP-A-2000-344881, JP-A-2005-82732 or WO03/000750, or a boron compound or an aluminum compound as an onium salt, described in JP-A-2003-501524 or JP-A-2003-510374.

The Lewis acid may, for example, be tris(pentaflorophenyl)borane, tris(pentaflorophenyl)aluminum, tris(pentaflorophenyloxy)borane and tris(pentaflorophenyloxy)aluminum, and tris(pentaflorophenyl)borane is particularly preferred since it has high activity.

A counter cation of the onium salt is preferably trityl cation or anilinium cation.

The onium salt is particularly preferably trityl tetrakis(pentafluorophenyl)borate or N,N'-dimethylanilinium tetrakis(pentafluorophenyl)borate.

The alkylene oxide (c) may be a ring-opening polymerizable alkylene oxide, and ethylene oxide, propylene oxide, styrene oxide, butylene oxide or cyclohexene oxide may be mentioned. The alkylene oxide (c) may be used alone or in combination as a mixture of two or more of them.

As the alkylene oxide (c), it is preferred to use propylene oxide and more preferred to use ethylene oxide and propylene oxide in combination. The ratio of propylene oxide to ethylene oxide (propylene oxide/ethylene oxide) is preferably from 100/0 to 20/80 (molar ratio) (100/0 to 25/75 (the mass ratio)), more preferably from 100/0 to 40/60 (molar ratio) (100/0 to 47/53) (the mass ratio)), further preferably from 100/0 to 50/50 (molar ratio) (100/0 to 57/43) (the mass ratio)), particularly preferably from 99/1 to 60/40 (molar ratio) (99/1 to 66/34) (the mass ratio)).

As compared with a case where only propylene oxide is used, when propylene oxide and ethylene oxide are used in combination, the proportion of terminal primary hydroxy groups of the polyoxyalkylene polyol (a2) becomes larger. In the polyoxyalkylene polyol (a2), the proportion of the terminal primary hydroxy groups is preferably from 1 to 60 mol % based on the total number of hydroxy groups per molecule of the polyol.

In the total mass of propylene oxide and ethylene oxide (100 mass %), when the proportion of ethylene oxide is at most 75 mass %, the reactivity of the polyol (A) with the polyisocyanate (B) becomes proper and moldability of a flexible polyurethane foam becomes good.

When the polyoxyalkylene polyol (a2) is produced, it is permitted that another cyclic compound other than the alkylene oxide (c) is present.

Such another cyclic compound may, for example, be a cyclic ester (ε-caprolactone, lactide or the like), or a cyclic carbonate (ethylene carbonate, propylene carbonate, neopentyl carbonate or the like). Another cyclic compound may be random-polymerizable or block-polymerizable.

As another cyclic compound, it is preferred to use a lactide derived from lactic acid obtained by fermentation of sugar derived from a plant, since it is thereby possible to increase the biomass degree in the polyoxyalkylene polyol (a2).

The process for producing the polyoxyalkylene polyol (a2) may, for example, be the following process (I) or (II).

(I) A process wherein into a pressure proof reactor equipped with a stirrer and a cooling jacket, the polyol (a1) derived from a natural fat/oil is introduced and a coordination anionic polymerization catalyst is added, and then the alkylene oxide (c) is added to ring-opening polymerization.

(II) A process wherein into a pressure proof reactor equipped with a stirrer and a cooling jacket, the polyol (a1) derived from a natural fat/oil is introduced and a cationic polymerization catalyst is added, and then the alkylene oxide (c) is added to ring-opening polymerization.

Process (I)

As the amount of the coordination anionic polymerization catalyst is made smaller, it is possible to reduce the amount of the coordination anionic polymerization catalyst to be contained in the polyoxyalkylene polyol (a2). As a result, it is possible to suppress the influence of the coordination anionic polymerization catalyst on the reactivity of the polyol (A) with the polyisocyanate (B) and the foam physical properties.

Usually, the coordination anionic polymerization catalyst is removed from the polyoxyalkylene polyol (a2). However, in a case where the amount of the coordination anionic polymerization catalyst remained in the polyoxyalkylene polyol (a2) is small, it is possible to use the polyoxyalkylene polyol (a2) directly without carrying out the step of removing the coordination anionic polymerization catalyst, whereby it is possible to increase the production efficiency of the polyoxyalkylene polyol (a2).

The amount of the coordination anionic polymerization catalyst is set so that a solid catalyst component in the polymerization catalyst (component having a polyether compound, excess ligand, etc. in a slurry removed) is present in an amount of preferably from 10 to 150 ppm in the polyoxyalkylene polyol (a2) immediately after the production. When the amount of the solid catalyst component of the polymerization catalyst contained in the polyoxyalkylene polyol (a2) is at least 10 ppm, sufficient activity will be obtained. If the amount of the solid catalyst component of the polymerization catalyst contained in the polyoxyalkylene polyol (a2) exceeds 150 ppm, it is not economical.

The ring-opening polymerization temperature is preferably from 30 to 180° C., more preferably from 70 to 160° C., particularly preferably from 90 to 140° C. When the ring-opening polymerization temperature is at least 30° C., ring-opening polymerization of the alkylene oxide (c) will sufficiently proceed. When the ring-opening polymerization temperature is at most 180° C., it is possible to suppress the decrease of the activity of the polymerization catalyst.

As the method for removing the coordination anionic polymerization catalyst from the polyoxyalkylene polyol (a2), the following method (δ) or (ε) may be mentioned, and the method (δ) is preferred since the hydrolysis will not proceed.

(δ) A method wherein the polymerization catalyst is adsorbed by using an adsorbent (for example, a synthetic silicate (such as magnesium silicate or aluminum silicate), an ion-exchange resin or an activated clay), and the adsorbent is then removed by filtration.

(ε) A method wherein the polymerization catalyst is neutralized by using a neutralizer (for example, an amine, an alkali metal hydroxide, an organic acid or a mineral acid), followed by removal by filtration.

Process (II)

As the process (II), the following process (II-1) is preferred.

(II-1) A process of using, as the cationic polymerization catalyst, at least one member selected from an aluminum or boron compound having at least one fluorine-substituted phenyl group or fluorine-substituted phenoxy group, in a case where the alkylene oxide (c) has at least 3 carbon atoms.

The amount of the cationic polymerization catalyst in the process (II-1) is preferably from 10 to 120 ppm, more preferably from 20 to 100 ppm, based on the polyol (a1) derived from a natural fat/oil. From the viewpoint of the purification and the cost of the polyoxyalkylene polyol (a2), the amount of the cationic polymerization catalyst is preferably as small as possible. However, when the amount of the cationic polymerization catalyst is at least 10 ppm, the ring-opening polymerization rate of the alkylene oxid (c) becomes properly high.

In the process (II-1), it is preferred to ring-opening polymerize preferably from 1 to 30 molecules of the alkylene oxide (c), more preferably from 1 to 20 molecules of the alkylene oxide (c), particularly preferably from 2 to 15 molecules of the alkylene oxide (c), per hydroxy group of the polyol (a1) derived from a natural fat/oil. When the number of molecules of the alkylene oxide (c) is at least 2 per hydroxy group of the polyol (a1) derived from a natural fat/oil, it becomes easier to make the proportion of the primary hydroxy groups in the total terminal hydroxy groups of the polyoxyalkylene polyol (a2) to a level of more than 45%. Further, it is thereby possible to reduce the amount of a multimer as the by-product.

In the process (II-1), it is preferred to maintain the temperature inside of the reactor at a specific temperature by cooling the reactor and adjusting the supplying rate of the alkylene oxide (c) to the reactor. The temperature inside of the reactor is usually from −15 to 140° C., preferably from 0 to 120° C., more preferably from 20 to 90° C. The ring-opening polymerization time is usually from 0.5 to 24 hours, preferably from 1 to 12 hours.

Commonality in the Processes (I) and (II)

In the ring-opening polymerization of the alkylene oxide (c), one type of the alkylene oxide (c) may be homopolymerized, or two or more type of the alkylene oxide (c) may be block polymerized and/or random polymerized.

The ring-opening polymerization of the alkylene oxide (c) is preferably carried out under a good stirring condition. When a stirring method of using a usual stirring blade, is used, it is preferred to increase the rotational speed of the stirring blade within a range not to deteriorate the stirring efficiency by inclusion of a large amount of gas of a gas phase taken into the reaction liquid.

Further, it is preferred to reduce the supplying rate of the alkylene oxide (c) to the reactor, as much as possible, from the viewpoint that the molecular weight distribution of the polyoxyalkylene polyol (a2) can be narrowed. Further, if the supplying rate is too low, the production efficiency will be deteriorated. Therefore, it is preferred to set the supplying rate of the alkylene oxide (c) taking these factors into consideration.

The ring-opening polymerization of the alkylene oxide (c) can be carried out in a solvent.

The solvent may, for example, be an aliphatic hydrocarbon (such as hexane, heptane or cyclohexane) an aromatic hydrocarbon (such as benzene, toluene or xylene) or a halogen type solvent (such as chloroform or dichloromethane).

An antioxidant, an anticorrosive or the like may be added to the polyoxyalkylene polyol (a2) to prevent deterioration during storage for a long period of time.

The polyoxyalkylene polyol (a2) has a hydroxy value of preferably from 15 to 250 mgKOH/g, more preferably from 20 to 200 mgKOH/g.

The polyoxyalkylene polyol (a2) has a weight average molecular weight (Mw) of preferably from 1,500 to 500,000, more preferably from 1,500 to 300,000, particularly preferably from 2,000 to 100,000.

The polyoxyalkylene polyol (a2) has a molecular weight distribution (Mw/Mn) of preferably from 1.2 to 20, more preferably from 1.2 to 15.

The polyoxyalkylene polyol (a2) more preferably has a hydroxy value of from 15 to 250 mgKOH/g and a molecular weight distribution of from 1.2 to 20.

(Vinyl Monomer)

The vinyl monomer may, for example, be acrylonitrile, styrene, a methacrylate or an acrylate. The vinyl monomer may be used alone or in combination as a mixture of two or more of them. The vinyl monomer is preferably a combination of acrylonitrile and styrene.

Further, in order to control the surface condition, shape and particle size distribution of polymer particles in the polymer-dispersed polyol, it is possible to use, as a vinyl monomer having a high-molecular-weight, a mono(meth)acrylate having repeating units in a required amount, e.g. a long chain alkyl(meth)acrylate having at least 8 carbon atoms, a hydroxy group-terminated polyalkylene glycol mono(meth)acrylate, an alkyl group-terminated polyalkylene glycol mono(meth) acrylate, a hydroxy group-terminated polycarbonate mono (meth)acrylate, an alkyl group-terminated polycarbonate mono(meth)acrylate, an alkyl group-terminated polycaprolactone mono(meth)acrylate, a hydroxy group-terminated polycaprolactone mono(meth)acrylate, an alkyl group-terminated polyether (one having at least 3 carbon atoms in a carbon linear moiety of repeating units) mono(meth)acrylate or a hydroxy group-terminated polyether (one having at least 3 carbon atoms in a carbon linear moiety of repeating units) mono(meth)acrylate.

Further, in order to control the surface condition, shape and particle size distribution of polymer particles in the polymer-dispersed polyol, a surfactant may be used at the time of polymerization of polymers. As the surfactant, a cationic surfactant, an anionic surfactant or a nonionic surfactant may be used, and a nonionic surfactant is preferably used, whereby e.g. excellent stability of the curving rate of a urethane foam is achieved.

(Process for Producing Polymer-Dispersed Polyol (A1))

The process for producing the polymer-dispersed polyol (A1) may, for example, be the following method.

A process of polymerizing a vinyl monomer by using a radical polymerization initiator in the presence of a base polyol.

As the base polyol, the polyol (a1) derived from a natural fat/oil may be used alone, the polyoxyalkylene polyol (a2) may be used alone, or the polyol (a1) derived from a natural fat/oil and the polyoxyalkylene polyol (a2) may be used in combination.

The radical polymerization initiator may be a known radical polymerization initiator (for example, an azo compound or a peroxide).

Further, in order to adjust the viscosity, a solvent may be used at a time of polymerization.

Still further, in order to adjust the molecular weight of the polymer particles, a solvent having a chain transfer property may be used, and a commercially available chain transfer agent may be initially added all at once at the time of polymerization or may be continuously added simultaneously with addition of the vinyl monomer.

The proportion of the polymer particles derived from the vinyl monomer in the polymer dispersed-polyol (A1) (100 mass %) is preferably at most 50 mass %, more preferably from 3 to 50 mass %, particularly preferably from 3 to 35 mass %.

The polymer dispersed-polyol (A1) has a hydroxy value of preferably from 10 to 200 mgKOH/g, more preferably from 15 to 150 mgKOH/g.

The hydroxy value of the polymer dispersed-polyol (A1) is obtained by the following formula based on the mass change before and after the polymerization of the vinyl monomer.

Hydroxy value={hydroxy value of the polyol (a1) derived from a natural fat/oil or hydroxy value of the polyoxyalkylene polyol (a2)}×{total amount of the charge amount of the polyol (a1) derived from a natural fat/oil and the charge amount of the polyoxyalkylene polyol (a2)}/{amount of the obtained polymer-dispersed polyol (A1)}.

The polymer-dispersed polyol (A1) has a weight average molecular weight (Mw) of preferably from 1,500 to 200,000, more preferably from 3,000 to 100,000.

The polymer-dispersed polyol (A1) has a molecular weight distribution (Mw/Mn) of preferably from 1.2 to 30, more preferably from 1.5 to 20.

With respect to the polymer-dispersed polyol (A1) of the present invention as explained above, since the base polyol is a specific polyol (a1) derived from a natural fat/oil or polyoxyalkylene polyol (a2) using the polyol (a1) derived from a natural fat/oil as an initiator, it is possible to produce a flexible polyurethane foam excellent in foam physical properties and its appearance without having a polyol derived from petroleum contained therein unlike a conventional polymer-dispersed polyol using castor oil. Further, since a polyol derived from petroleum is not used in combination, the biomass degree is higher than the conventional polymer-dispersed polyol.

<Process for Producing Flexible Polyurethane Foam>

The process for producing a flexible polyurethane foam of the present invention is a process of reacting a polyol (A) with a polyisocyanate (B) in the presence of a catalyst (C) and a blowing agent (D).

(Polyol (A))

The polyol (A) contains at least the polymer-dispersed polyol (A1).

The polyol (A) preferably contains the polymer-dispersed polyol (A1) and a polyoxyalkylene polyol (A2).

The polyoxyalkylene polyol (A2) is preferably a polyoxyalkylene polyol (except for the polyoxyalkylene polyol (a2)) having an average number of hydroxy groups of from 2 to 8 and a hydroxy value of from 20 to 160 mgKOH/g.

When the polyoxyalkylene polyol (A2) has an average number of hydroxy groups of at least 2, the durability and the riding comfort of the flexible polyurethane foam tend to be good. When the polyoxyalkylene polyol (A2) has an average number of hydroxy groups of at most 8, the flexible polyurethane foam becomes not so rigid, whereby the foam physical properties such as elongation tend to be good.

The average number of hydroxy groups means the average number of active hydrogen atoms of an initiator.

When the polyoxyalkylene polyol (A2) has a hydroxy value of at least 20 mgKOH/g, the viscosity will not be so high, whereby the workability tends to be good. When the polyoxyalkylene polyol (A2) has a hydroxy value of at most 160 mgKOH/g, the flexible polyurethane foam will not be so rigid, whereby the foam physical properties such as elongation tend to be good.

The polyoxyalkylene polyol (A2) has a weight average molecular weight (Mw) of preferably from 700 to 22,000, more preferably from 1,500 to 20,000, particularly preferably from 2,000 to 15,000.

The polyoxyalkylene polyol (A2) can be obtained by subjecting an alkylene oxide to ring-opening polymerization to an initiator in the presence of a polymerization catalyst.

The polymerization catalyst may, for example, be an alkali metal compound catalyst (for example, a sodium type catalyst, a potassium type catalyst or a cesium type catalyst), a cationic polymerization catalyst, a double metal cyanide complex catalyst or a phosphazenium compound.

The sodium or potassium type catalyst may, for example, be sodium metal, potassium metal, a sodium or potassium alkoxide (such as sodium methoxide, sodium ethoxide, sodium propoxide, potassium methoxide, potassium ethoxide or potassium propoxide), sodium hydroxide, potassium hydroxide, sodium carbonate or potassium carbonate.

The cesium type catalyst may, for example, be cesium metal, a cesium alkoxide (such as cesium methoxide, cesium ethoxide or cesium propoxide), cesium hydroxide or cesium carbonate.

The coordination anionic polymerization catalyst may be the same coordination anionic polymerization catalyst mentioned as the polymerization catalyst (b).

The cationic polymerization catalyst may be the same cationic polymerization catalyst as mentioned as the polymerization catalyst (b).

The initiator may, for example, be ethylene glycol, diethylene glycol, propylene glycol, dipropylene glycol, neopentyl glycol, 1,4-butanediol, 1,6-hexanediol, glycerin, trimethylolpropane, pentaerythritol, diglycerin, dextrose, sucrose, bisphenol A, ethylenediamine or a polyoxyalkylene polyol having a low molecular weight obtained by adding an alkylene oxide thereto.

The alkylene oxide may, for example, ethylene oxide, propylene oxide, 1,2-butylene oxide, 2,3-butylene oxide or styrene oxide, and propylene oxide or ethylene oxide is preferred. When the ethylene oxide is used, the proportion of the ethylene oxide in the alkylene oxide (100 mass %) is preferably at most 30 mass %, more preferably at most 25 mass %. When the proportion of the ethylene oxide is at most 30 mass %, the reactivity of the polyol (A) with the polyisocyanate (B) becomes proper, and the moldability of the flexible polyurethane foam becomes good.

The polyoxyalkylene polyol (A2) may be used alone, or two or more types may be used in combination. When two or more types of polyoxyalkylene polyols (A2) are used, the average number of the hydroxy groups, the hydroxy value and the weight average molecular weight of each polyoxyalkylene polyol (A2) is preferably in the above preferred range.

The ratio of the polymer-dispersed polyol (A1) to the polyoxyalkylene polyol (A2), (A1)/(A2), is preferably in a range of from 10/90 to 90/10 (mass ratio), more preferably from 15/85 to 80/20 (mass ratio). When the proportion of the polyoxyalkylene polyol (A2) is at least 10 mass %, the moldability of a flexible polyurethane foam is improved. When the proportion of the polyoxyalkylene polyol (A2) is at most 90 mass %, polyols derived from petroleum are decreased, whereby influence over the environment is suppressed.

The polyol (A) may contain another polyol other than the polymer-dispersed polyol (A1) and the polyoxyalkylene polyol (A2).

Such another polyol may, for example, be a polyol (a1) derived from a natural fat/oil, a polyoxyalkylene polyol (a2), a polymer-dispersed polyol (A3), a polyester polyol, a polycarbonate polyol, a natural fat/oil containing hydroxy groups, or their modified products.

The polyol (a1) derived from a natural fat/oil is the above mentioned polyol (a1) derived from a natural fat/oil, having no polymer particles.

The polyoxyalkylene polyol (a2) is the above mentioned polyoxyalkylene polyol (a2), having no polymer particles.

The polymer-dispersed polyol (A3) is a polymer-dispersed polyol having the polyoxyalkylene polyol (A2) as a base polyol. By dispersing polymer particles in the base polyol, the hardness, air flow and other physical properties of the flexible polyurethane foam can be improved.

The polymer of the polymer particles may be an addition polymerization type polymer or a condensation polymerization type polymer.

The addition polymerization type polymer may, for example, be a homopolymer or copolymer of a vinyl monomer (for example, acrylonitrile, styrene, a methacrylate or an acrylate).

The condensation polymerization type polymer may, for example, be polyester, polyurea, polyurethane or melamine.

By the presence of the polymer particles, the hydroxy value of the polymer-dispersed polyol (A3) is usually lower than the hydroxy value of the base polyol. The average number of hydroxy groups, the weight average molecular weight (Mw) and the like of the polymer-dispersed polyol (A3) are the numerical values for the base polyol.

The polyester polyol may, for example, be a polyester polyol obtained by condensing a low-molecular-weight polyol and a carboxylic acid, or a lactone polyol.

The low-molecular-weight polyol may, for example, be a $C_{2-10}$ dihydric alcohol (such as ethylene glycol or propylene glycol), a $C_{2-10}$ trihydric alcohol (such as glycerin, trimethylolpropane or trimethylolethane), a tetrahydric alcohol (such as pentaerythritol or diglycerin), or a saccharide (such as sorbitol or sucrose).

The carboxylic acid may, for example, be a $C_{2-10}$ dicarboxylic acid (such as succinic acid, adipic acid, maleic acid, fumaric acid, phthalic acid or isophthalic acid) or a $C_{2-10}$ acid anhydride (such as succinic anhydride, maleic anhydride or phthalic anhydride).

The lactone polyol may, for example, be an ε-caprolactone ring-opening polymerized product or β-methyl-δ-valerolactone ring-opening polymerized product.

The polycarbonate polyol may be one obtained by a dehydrochlorination reaction of the low-molecular-weight polyol with phosgene, or by a transesterification reaction of the low-molecular-weight polyol with diethylene carbonate, dimethyl carbonate, diphenyl carbonate or the like.

The proportion of another polyol is preferably at most 40 mass % in the polyol (A) (100 mass %). When the proportion of another polyol is at most 40 mass %, the moldability of the flexible polyurethane foam can be satisfied while maintaining a high biomass degree.

(Another High-Molecular-Weight Active Hydrogen Compound)

As a compound to be reacted with the polyisocyanate (B), it is possible to use the polyol (A) and another high-molecular-weight active hydrogen compound in combination.

Such another high-molecular-weight active hydrogen compound may, for example, be a high-molecular-weight polyamine having at least 2 primary amino groups or secondary amino groups; a high-molecular-weight compound having at least one primary amino group or secondary amino group and at least one hydroxy group; or a piperazine polyol.

The high-molecular-weight polyamine or the high-molecular-weight compound may be a compound obtained by converting some or all hydroxy groups in a polyoxyalkylene polyol to amino groups; or a compound obtained in such a manner that a prepolymer having isocyanate groups at its terminals, is obtained by reacting a polyoxyalkylene polyol with an excess equivalent of a polyisocyanate compound, and the isocyanate groups of the prepolymer are converted to amino groups by hydrolysis.

The piperazine polyol is a polyoxyalkylene polyol obtained by ring-opening polymerization of an alkylene oxide with piperazines.

The piperazines mean piperazine or a substituted piperazine wherein a hydrogen atom in the piperazine is substituted by an organic group such as an alkyl group or an aminoalkyl group.

The piperazines are required to have at least two active hydrogen atoms.

In the piperazine polyol, two nitrogen atoms constituting a piperazine ring constitute tertiary amines.

The piperazines may be piperazine, alkyl piperazines in which a hydrogen atom bonded to a carbon atom constituting the ring is substituted by a lower alkyl group (such as 2-methylpiperazine, 2-ethylpiperazine, 2-butylpiperazine, 2-hexylpiperazine, 2,5-, 2,6-, 2,3- or 2,2-dimethylpiperazine or 2,3,5,6- or 2,2,5,5-tetramethylpiperazine) or N-aminoalkylpiperazines in which a hydrogen atom bonded to a nitrogen atom constituting the ring, is substituted by an aminoalkyl group (such as N-(2-aminoethyl)piperazine). Preferred are substituted piperazines, and more preferred are substituted piperazines having at least 3 nitrogen atoms in its molecule, such as piperazine having hydrogen substituted by e.g. an aminoalkyl group.

Further, as the substituted piperazines N-substituted piperazines are preferred, N-aminoalkylpiperazines are further preferred, and N-(aminoethyl)piperazine is particularly preferred.

An alkylene oxide to be ring-opening polymerized with such piperazines, is preferably an alkylene oxide having at least 2 carbon atoms, such as ethylene oxide, propylene oxide, 1,2-butylene oxide, 2,3-butylene oxide or styrene oxide.

The molecular weight per functional group of such another high-molecular-weight active hydrogen compound is preferably at least 400, more preferably at least 800. The molecular weight per functional group is preferably at most 5,000.

The average number of functional groups of such another high-molecular-weight active hydrogen compound is preferably from 2 to 8.

The proportion of such another high-molecular-weight active hydrogen compound is preferably at most 20 mass %, based on the total amount (100 mass %) of the polyol (A) and another high-molecular-weight active hydrogen compound. When the proportion of such another high-molecular-weight active hydrogen compound is at most 20 mass %, the reactivity with the polyisocyanate (B) will not be too high, whereby the moldability or the like of the flexible polyurethane foam tends to be good.

(Polyisocyanate (B))

The polyisocyanate (B) may, for example, be an aromatic polyisocyanate compound having at least 2 isocyanate compound groups, a mixture of two or more of such compounds, or a modified-polyisocyanate obtained by modifying it. Specifically, it may, for example, be a polyisocyanate such as tolylene diisocyanate (TDI), diphenylmethane diisocyanate (MDI) or polymethylene polyphenyl polyisocyanate (name: crude MDI), or its prepolymer type modified product, nurate modified product, urea modified product or carbodiimide modified product.

The total amount of MDI and crude MDI in the polyisocyanate (B) (100 mass %) is preferably more than 0 mass % and at most 100 mass %, more preferably from 5 to 80 mass %, particularly preferably from 10 to 60 mass %. When the total amount of MDI and crude MDI is at most 80 mass %, the foam physical properties such as durability, touch of a foam, etc. become good.

The polyisocyanate (B) may be a prepolymer. The prepolymer may be a prepolymer of TDI, MDI or crude MDI with a polyol derived from a natural fat/oil, a polyoxyalkylene polyol having an alkylene oxide ring-opening polymerized to the polyol derived from a natural fat/oil, or a petroleum polyoxyalkylene polyol.

The amount of the polyisocyanate (B) is preferably in a range of from 80 to 125, particularly preferably in a range of from 85 to 120, by the isocyanate index. The isocyanate index is represented by 100 times of the number of isocyanate groups based on the total active hydrogen of the polyol (A), another high-molecular-weight active hydrogen compound, a crosslinking agent, water, and the like.

(Crosslinking Agent)

In the present invention, it is possible to use a crosslinking agent as a case requires.

The crosslinking agent is preferably a compound having a number of active hydrogen-containing groups of from 2 to 8 and a hydroxy value of from 200 to 2,000 mgKOH/g. The crosslinking agent may be a compound which has at least 2 functional groups selected from hydroxy groups, primary amino groups and secondary amino groups. Such crosslinking agents may be used alone or in combination as a mixture of two or more of them.

The crosslinking agent having hydroxy groups is preferably a compound having 2 to 8 hydroxy groups, and a polyhydric alcohol, or a low-molecular-weight polyoxyalkylene polyol obtained by adding an alkylene oxide to the polyhydric alcohol or a polyol having a tertiary amino group may be mentioned.

Specific examples of the crosslinking agent having hydroxy groups may be ethylene glycol, 1,4-butanediol, neopentyl glycol, 1,6-hexanediol, diethylene glycol, triethylene glycol, dipropylene glycol, monoethanolamine, diethanolamine, triethanolamine, glycerin, N-alkyl diethanol, a bisphenol A-alkylene oxide adduct, a glycerin-alkylene oxide adduct, a trimethylolpropane-alkylene oxide adduct, a pentaerythritol-alkylene oxide adduct, a sorbitol-alkylene oxide adduct, a sucrose-alkylene oxide adduct, an aliphatic amine-alkylene oxide adduct, an alicyclic amine-alkylene oxide adduct, a heterocyclic polyamine-alkylene oxide adduct, and an aromatic amine-alkylene oxide adduct, and diethanolamine is referred, since hysteresis loss is suited.

The heterocyclic polyamine-alkylene oxide adduct is obtained by ring-opening polymerization of an alkylene oxide with e.g. peperazine, a short-chain alkyl-substituted piperazine (such as 2-methylpiperazine, 2-ethylpiperazine, 2-butylpiperazine, 2-hexylpiperazine, 2,5-, 2,6-, 2,3- or 2,2-dimethylpiperazine, or 2,3,5,6- or 2,2,5,5-tetramethylpiperazine), or an aminoalkyl-substituted piperazine (such as 1-(2-aminoethyl)piperazine).

A crosslinking agent (an amine type crosslinking agent) having a primary amino group or secondary amino group may, for example, be an aromatic polyamine, an aliphatic polyamine or an alicyclic polyamine.

The aromatic polyamine is preferably an aromatic diamine. The aromatic diamine is preferably an aromatic diamine having at least one substituent selected from an alkyl group, a cycloalkyl group, an alkoxy group, an alkylthio group and an electron-attractive group, in an aromatic nucleus having amino groups bonded thereto, particularly preferably a diaminobenzene derivative.

With respect to the above substituents except for the electron-attractive group, from 2 to 4 substituents are preferably bonded to the aromatic nucleus having amino groups bonded thereto, more preferably at least one at an ortho-position to the position where the amino group is bonded, particularly preferably, they are bonded at all positions.

With respect to the electron-attractive group, 1 or 2 groups are preferably bonded to the aromatic nucleus having amino groups bonded thereto. The electron-attractive group and another substituent may be bonded to one aromatic nucleus.

The alkyl group, alkoxy group and alkylthio group preferably have at most 4 carbon atoms.

The cycloalkyl group is preferably a cyclohexyl group.

The electron-attractive group is preferably a halogen atom, a trihalomethyl group, a nitro group, a cyano group or an alkoxycarbonyl group, particularly preferably a chlorine atom, a trifluoromethyl group or a nitro group.

The aliphatic polyamine may, for example, be a diaminoalkane having at most 6 carbon atoms, a polyalkylene polyamine, a polyamine obtained by converting some or all hydroxy groups in a low-molecular-weight polyoxyalkylene polyol to amino groups, or an aromatic compound having at least 2 aminoalkyl groups.

The alicyclic polyamine may be a cycloalkane having at least 2 amino groups and/or aminoalkyl groups.

Specific examples of the amine type crosslinking agent may be 3,5-diethyl-2,4 (or 2,6)-diaminotoluene (DETDA), 2-chloro-p-phenylenediamine (CPA), 3,5-dimethylthio-2,4 (or 2,6)-diaminotoluene, 1-trifluoromethyl-3,5-diaminobenzene, 1-trifluoromethyl-4-chloro-3,5-diaminobenzene, 2,4-toluenediamine, 2,6-toluenediamine, bis(3,5-dimethyl-4-aminophenyl)methane, 4,4-diaminodiphenylmethane, ethylenediamine, m-xylenediamine, 1,4-diaminohexane, 1,3-bis(aminomethyl)cyclohexane and isophorone diamine, and preferred is diethyltoluenediamine (that is one type or a mixture of two or more types of 3,5-diethyl-2,4 (or 2,6)-diaminotoluene), dimethylthiotoluenediamine or a diaminobenzene derivative such as monochlorodiaminobenzene or trifluoromethyldiaminobenzene.

The amount of the crosslinking agent is preferably from 0.1 to 10 parts by mass based on 100 parts by mass of the polyol (A).

(Catalyst (C))

The catalyst (C) is a catalyst to accelerate a urethanization reaction.

As the catalyst (C), an amine compound, an organic metal compound, a reactive amine compound or a metal carboxylate may, for example, be mentioned. Such catalysts (C) may be used alone or in combination as a mixture of two or more of them.

As the amine compound, triethylenediamine, a dipropylene glycol solution of bis-((2-dimethylamino)ethyl)ether and an aliphatic amine such as morpholine may, for example, be mentioned.

The reactive amine compound is a compound wherein a part of the amine compound structure is converted to a hydroxy group or an amino group so as to be reactive with an isocyanate group.

As the reactive amine compound, dimethylethanolamine, trimethylaminoethylethanolamine and dimethylaminoethoxyethoxyethanol may, for example, be mentioned.

The amount of the amine compound catalyst or the reactive amine compound catalyst, is preferably at most 2.0 parts by mass, more preferably from 0.05 to 1.5 parts by mass, per 100 parts by mass in total of the polyol (A) and another high-molecular-weight active hydrogen compound.

The organic metal compound may, for example, be an organic tin compound, an organic bismuth compound, an organic lead compound or an organic zinc compound. Specific examples may be di-n-butyltin oxide, di-n-butyltin dilaurate, di-n-butyltin, di-n-butyltin diacetate, di-n-octyltin oxide, di-n-octyltin dilaurate, monobutyltin trichloride, di-n-butyltin dialkyl mercaptan, and di-n-octyltin dialkyl mercaptan.

The amount of the organic metal compound is preferably at most 2.0 parts by mass, more preferably from 0.005 to 1.5 parts by mass, per 100 parts by mass in total of the polyol (A) and another high-molecular-weight active hydrogen compound.

(Blowing Agent (D))

As a blowing agent (D), preferred is at least one member selected from water and an inert gas.

As the inert gas, air, nitrogen gas or liquified carbon dioxide gas may be mentioned.

The amount of such a blowing agent may be adjusted depending on the requirement such as a blowing magnification.

When only water is used as the blowing agent (D), the amount of water is preferably at most 10 parts by mass, more preferably from 0.1 to 8 parts by mass, per 100 parts by mass in total of the polyol (A) and another high-molecular-weight active hydrogen compound.

(Foam Stabilizer)

In the present invention, a foam stabilizer may be used as the case requires.

The foam stabilizer is a component to form good foams.

The foam stabilizer may, for example, be a silicone type foam stabilizer or a fluorine type foam stabilizer.

The amount of the foam stabilizer is preferably from 0.1 to 10 parts by mass per 100 parts by mass in total of the polyol (A) and another high-molecular-weight active hydrogen compound.

(Cell Opener)

In the present invention, a cell opener may be used as the case requires.

The use of the cell opener is preferred from the viewpoint of the moldability of the flexible polyurethane foam, specifically, the reduction of tight cells.

The cell opener is preferably a polyoxyalkylene polyol having an average number of hydroxy groups of from 2 to 8, a hydroxy value of from 20 to 100 mgKOH/g and a proportion of ethylene oxide of from 50 to 100 mass %.

(Other Formulating Agents)

Other formulating agents which may optionally be used, may, for example, be a filler, a stabilizer, a colorant and a flame retardant.

(Process for Producing Flexible Polyurethane Foam)

The process for producing a flexible polyurethane foam may be carried out by a method in which a reactive mixture is injected into a mold, followed by foam-molding (a molding method) or a method in which a reactive mixture is foamed in an open system (a slab method).

The reactive mixture is a mixture having the above mentioned components mixed.

Molding Method

As the molding method, preferred is a method of injecting the reactive mixture into a closed mold (a reaction-injection molding method) or a method in which the reactive mixture is injected into a mold in an open state, followed by closing. As the latter method, it is preferably carried out by a method of injecting the reactive mixture into a mold by using a low pressure machine or a high pressure machine.

The high pressure machine is preferably of a type to mix two liquids. One of the two liquids is the polyisocyanate (B) and the other liquid is a mixture of all components other than the polyisocyanate (B). Depending on a case, it may be a type to mix at least three liquids by having the catalyst (C) or the cell opener as a separate component (which is usually used as dispersed or dissolved in a part of a high-molecular-weight polyol).

The temperature of the reactive mixture is preferably from 10 to 40° C. When the temperature is at least 10° C., the viscosity of the reactive mixture will not be so high, whereby liquid mixing of the liquids tends to be good. When the temperature is at most 40° C., the reaction rate will not be too high, whereby the moldability or the like tends to be good.

The mold temperature is preferably from 10° C. to 80° C., particularly preferably from 30° C. to 70° C.

The curing time is preferably from 1 to 20 minutes, more preferably from 3 to 10 minutes, particularly preferably from 1 to 7 minutes. When the curing time is at least 1 minute, curing will be sufficiently conducted. When the curing time is at most 20 minutes, productivity will be good.

Slab Method

The slab method may be a known method such as a one shot method, a semiprepolymer method or a prepolymer method. For the production of the flexible polyurethane foam, it is possible to use a known production apparatus.

According to the above described process for producing the flexible polyurethane foam of the present invention, since the polymer-dispersed polyol (A1) of the present invention having a higher biomass degree than a conventional polymer-dispersed polyol is used, it is possible to produce a flexible polyurethane foam which has a higher biomass degree than a conventional flexible polyurethane foam and is excellent in foam physical properties and its appearance.

The flexible polyurethane foam produced by the process of the present invention can be used for an interior material for a vehicle (such as sheet cushions, sheet backs, head rests or arm rests), an interior material for a railway vehicle, beddings, mattresses, cushions, etc.

EXAMPLES

Now, the present invention will be described in further detail with reference to Examples, but it should be understood that the present invention is by no means limited thereto.

Examples 1 to 3, 5 to 12, 16 and 17 are Examples of the present invention, and Examples 4, 13 to 15 are Comparative Examples.

(Hydroxy Value)

The hydroxy values of polyols other than the polymer-dispersed polyol (A1) were measured in accordance with JIS K 1557 (titration method).

If the hydroxy value of the polymer-dispersed polyol (A1) is measured by the titration method, the measurement tends to be hindered by a resin precipitation, and therefore, it was obtained by measuring the polymerization balance by calculation as mentioned below.

(Number Average Molecular Weight and Weight Average Molecular Weight)

The number average molecular weight (Mn) and the weight average molecular weight (Mw) were measured by the following process.

With respect to some types of monodispersed polystyrene polymers having different polymerization degrees, which are commercially available as standard samples for molecular weight measurement, GPC was measured by using a commercially-available GPC measuring device (tradename: HLC-8220GPC, manufactured by Tosoh Corporation), and based on the relation of the molecular weight and the maintaining retention time of each polystyrene, a calibration curve was prepared.

A sample was diluted by tetrahydrofuran to 0.5 mass % and passed through a filter of 0.5 μm, and GPC of the sample was measured by using the GPC measuring device.

By using the calibration curve, the GPC spectrum of a sample was analyzed by a computer, whereby the number average molecular weight (Mn) and the weight average molecular weight (Mw) of the sample were obtained.

(Biomass Degree)

The biomass degree of polyols (including a polymer-dispersed polyol) was calculated as a proportion (unit: %) of the mass of the polyol derived from a natural fat/oil, based on the total mass of the raw materials (such as a polyol derived from a natural fat/oil, an alkylene oxide and a vinyl monomer) which constitute the polyol.

The biomass degree of the foam was calculated as a proportion (unit: %) of the mass of the polyol derived from a natural fat/oil contained in the polyol, based on the total mass of the raw materials (such as a polyol, a polyisocyanate, a catalyst and a blowing agent) which constitute the reactive mixture.

The mass of the polyol derived from a natural fat/oil contained in the polyol was calculated from {the mass of the polyol}×{the biomass degree (%) of the polyol}/100.

(Polyol (a1) Derived from a Natural Fat/Oil)

As the polyol (a1) derived from a natural fat/oil, aerated soybean oil (tradename: Soyol R2-052F, manufactured by Urethane Soy Systems Company) obtained by a blowing method by using soybean oil as a raw material was prepared. The hydroxy value was 45.3 mgKOH/g, the number average molecular weight (Mn) was 2,231, the weight average molecular weight (Mw) was 9,060, and the molecular weight distribution (Mw/Mn) was 4.061.

(Polymerization Catalyst (b))

As the polymerization catalyst (b), a zinc hexacyanocobaltate complex having tert-butyl alcohol coordinated (a DMC catalyst) was prepared as follows.

Into a 500 mL flask, an aqueous solution comprising 10.2 g of zinc chloride and 10 g of water was introduced. An aqueous solution comprising 4.2 g of potassium hexacyanocobaltate ($K_3Co(CN)_6$) and 75 g of water was dropwise added to the zinc chloride aqueous solution with stirring at 300 rpm over 30 minutes. Meantime, the solution mixture in the flask was maintained at 40° C. After completion of the dropwise addition of the potassium hexacyanocobaltate aqueous solution, the mixture in the flask was further stirred for 30 minutes, and then, a mixture comprising 80 g of tert-butyl alcohol (hereinafter referred to as TBA), 80 g of water and 0.6 g of a polyol P was added thereto, followed by stirring at 40° C. for 30 minutes and further at 60° C. for 60 minutes.

The polyol P is a polyoxypropylene diol which is obtained by ring-opening polymerization of propylene oxide with propylene glycol in the presence of a potassium hydroxide catalyst and is purified by dealkalization, and which has a hydroxy equivalent of 501.

The mixture thus obtained was filtrated under pressure (0.25 MPa) by using a circular filter plate having a diameter of 125 mm and a quantitative filter paper for fine particles (No. 5C, manufactured by ADVANTEC) to obtain a solid (a cake) containing a double metal cyanide complex.

Then, the cake was transferred into a flask, and a liquid mixture comprising 36 g of TBA and 84 g of water was added thereto, followed by stirring for 30 minutes. Then, filtration under pressure was carried out under the same conditions as mentioned above to obtain a cake.

The obtained cake was transferred into a flask, and a liquid mixture comprising 108 g of TBA and 12 g of water was further added thereto, followed by stirring for 30 minutes to obtain a slurry in which the double metal cyanide complex catalyst was dispersed in the TBA-water liquid mixture. To the slurry, 120 g of the polyol P was added, and then, under reduced pressure, a volatile component was distilled at 80° C. for 3 hours, further at 115° C. for 3 hours, to obtain a slurry DMC catalyst (the slurry of the polymerization catalyst (b)). The concentration (the active ingredient concentration) of the DMC catalyst (the solid catalyst component) contained in the slurry was 5.33 mass %.

(Polyoxyalkylene Polyol (a2))

Into a 500 ml stainless steel pressure proof reactor with a stirrer, 248.2 g of the polyol (a1) derived from a natural fat/oil and 682 mg of the slurry of the polymerization catalyst (b) (36 mg as the solid catalyst component) were introduced. After flushing inside of the reactor with nitrogen, the temperature was raised to 120° C., and vacuum-dehydration was carried out for 2 hours.

A mixture of 24.1 g of propylene oxide and 12.2 g of ethylene oxide was supplied into the reactor over 40 minutes, followed by continued stirring for 2 hours 30 minutes, and stop of pressure dropping was confirmed. Meantime, the inner temperature of the reactor was kept at 120° C. and the stirring rate at 500 rpm to let the reaction proceed.

The appearance of the obtained polyoxyalkylene polyol (a2) was a transparent liquid at normal temperature. The hydroxy value was 43.8 mgKOH/g, the number average molecular weight (Mn) was 2,338, the weight average molecular weight (Mw) was 8,516, the molecular weight distribution (Mw/Mn) was 3.64, and the biomass degree was 87%.

Example 1

Polymer-Dispersed Polyol (A1-1)

Into a 2 litter glass bottle, a liquid mixture for dropwise addition, comprising 936 parts by mass of the polyoxyalkylene polyol (a2), 595.6 parts by mass of acrylonitrile, 198.4 parts by mass of styrene and 30 parts by mass of 2,2'-azobis (2-methylbutyronitrile) was added, and the glass bottle was attached to a rotary type quantitative supply pump equipped with a tube (tradename: MP-1000, manufactured by Tokyo Rikakikai Co,. Ltd.).

The mass of a reactor comprising a 5 litter separable flask equipped with a vacuum stirrer and a stirring stick was measured and regarded as the tare ($W_o$). 2,240 parts by mass of the polyoxyalkylene polyol (a2) for initial charge was added thereto, and exit tubes for a condenser tube and a liquid supply pump were attached. Then, the separable flask was immersed in an oil bath at 125° C. to adjust the inner temperature to be 115±5° C. After the temperature became stable, the liquid mixture for dropwise addition was dropwise added at a constant rate over 4 hours 10 minutes. After dropwise addition, the reaction was subjected to aging for 30 minutes. Then, the volatile substances such as unreacted monomers were distilled out in vacuum for 2 hours at 120° C. under 3 torr to obtain the polymer-dispersed polyol (A1-1). The mass $W_1$ of the reactor and the obtained product was measured. The hydroxy value of the polymer-dispersed polyol (A1-1) was calculated from the following formula, whereupon it was 37.9 mgKOH/g.

Hydroxy value={the hydroxy value of the polyoxyalkylene polyol (a2) of 43.8 mgKOH/g}×{the charged amount of the polyoxyalkylene polyol (a2) of 3,176 parts by mass}/{the amount ($W_1$−$W_o$) of the obtained polymer-dispersed polyol (A1-1)=3,794 parts by mass}.

The polymer-dispersed polyol (A1-1) had a number average molecular weight (Mn) of 2,760, a weight average molecular weight (Mw) of 25,969 and a molecular weight distribution (Mw/Mn) of 9.409.

The biomass degree of the polymer-dispersed polyol (A1-1) was calculated from the following formula, whereupon it was 72.8%.

Biomass degree=the biomass degree of the polyoxyalkylene polyol (a2) of 87%}×{the charged amount of the polyoxyalkylene polyol (a2) of 3,176 parts by mass}/{the amount ($W_1$−$W_o$) of the obtained polymer-dispersed polyol (A1-1)=3, 794 parts by mass}.

The proportion of the polymer particles was calculated from the following formula, whereupon it was 16.3 mass %.

Proportion of polymer particles=100−100×{the charged amount of the polyoxyalkylene polyol (a2) of 3,176 parts by mass}/{the amount ($W_1$−$W_o$) of the obtained polymer-dispersed polyol (A1-1)=3,794 parts by mass}.

Example 2

(Polymer-Dispersed Polyol (A1-2))

A polymer-dispersed polyol (A1-2) was obtained in the same manner as in Example 1 except that the polyoxyalkylene polyol (a2) was changed to the polyol (a1) derived from a natural fat/oil. The hydroxy value (calculated value) was 37.7 mgKOH/g, the number average molecular weight (Mn) was 2,459, the weight average molecular weight (Mw) was 26,820, the molecular weight distribution (Mw/Mn) was 10.907, and the biomass degree (calculated value) was 83.3%. The proportion of polymer particles (calculated value) was 16.7 mass %. The biomass degree was calculated regarding the biomass degree of the polyol (a1) derived from a natural fat/oil as 100% in the same manner as in Example 1.

Example 3

(Polymer-Dispersed Polyol (A1-3))

A polymer-dispersed polyol (A1-3) was obtained in the same manner as in Example 2 except that 595.6 parts by mass of acrylonitrile and 198.4 parts by mass of styrene were changed to 198.4 parts by mass of acrylonitriile and 595.6 parts by mass of styrene. The hydroxy value (calculated value) was 37.3 mgKOH/g, the number average molecular weight (Mn) was 2,860, the weight average molecular weight (Mw) was 28,885, the molecular weight distribution (Mw/Mn) was 10.1, and the biomass degree (calculated value) was 82.3%. The proportion of polymer particles was 17.6 mass %.

Example 4

(Polymer-Dispersed Polyol (A1-4))
(Polymer-Dispersed Castor Oil)

A polymer-dispersed castor oil was obtained in the same manner as in Example 1 except that the polyoxyalkylene polyol (a2) was changed to purified castor oil (manufactured by Matsumoto Yushi-Seiyaku Co., Ltd.). The polymer-dispersed castor oil had a high viscosity, showed thixotropic properties and had a problem in flowability, and therefore, it was unsuitable for the production of a flexible polyurethane foam. The hydroxy value (calculated value) was 133.0 mgKOH/g, the number average molecular weight (Mn) was 1,458, the weight average molecular weight (Mw) was 2,095, the molecular weight distribution (Mw/Mn) was 1.436, and the biomass degree (calculated value) was 82.6%. The proportion of polymer particles (calculated value) was 17.4 mass %. The biomass degree was calculated regarding the biomass degree of the purified castor oil as 100% in the same manner as in Example 1.

Example 5

(Polymer-Dispersed Polyol (A1-5))
(Micromonomer Copolymer-Dispersed Polyol)

Into a 0.5 litter glass bottle, a liquid mixture (for dropwise addition) comprising 210.6 parts by mass of the polyol (a1) derived from a natural fat/oil, 134.01 parts by mass of acrylonitrile, 44.64 parts by mass of styrene, 5.4 parts by weight of BLEMMER VA (behenyl acrylate) manufactured by NOF Corporation and 6.75 parts by mass of 2,2'-azobis(2-methylbutyronitrile) was added, and the glass bottle was attached to a rotary type quantitative supply pump equipped with a tube (tradename: MP-1000, manufactured by Tokyo Rikakikai Co., Ltd.).

The mass of a reactor comprising a 1 litter separable flask equipped with a vacuum stirrer and a stirring stick was measured and regarded as the tare ($W_o$). 2,240 of parts by mass of the polyol (a1) derived from a natural fat/oil for initial charge was added thereto, and exit tubes for a condenser tube and a liquid supply pump were attached. Then, the separable flask was immersed in an oil bath at 125° C. to adjust the inner temperature to be 115±5° C. After the temperature became stable, the liquid mixture for dropwise addition was dropwise added at a constant rate over 4 hours 10 minutes. After dropwise addition, the reaction was subjected to aging for 30 minutes. Then, the volatile substances such as unreacted monomers were distilled out in vacuum for 2 hours at 120° C. under 3 torr to obtain the polymer-dispersed polyol (A1-5).

The obtained (A1-5) had a hydroxy value (calculated value) of 38.4 mgKOH/g, a number average molecular weight (Mn) of 2,132, a weight average molecular weight (Mw) of 15,023, a molecular weight distribution (Mw/Mn) of 7.0, and a biomass degree (calculated value) of 83.3%. Further, the proportion of polymer particles was 15.3 mass %.

Example 6

(Polymer-Dispersed Polyol (A1-6))
(Surfactant Addition Polymerization Polymer-Dispersed Polyol)

A polymer-dispersed polyol (A1-6) having 5.4 parts by weight of a surfactant added was obtained in the same manner as in Example 5 except that BLEMMER VA was changed to 5.4 parts by weight of W-1445 manufactured by Nippon Nyukazai Co., Ltd.

The obtained (A1-6) had a hydroxy value (calculated value) of 38.2 mgKOH/g, a number average molecular weight (Mn) of 2,210, a weight average molecular weight (Mw) of 22,447, a molecular weight distribution (Mw/Mn) of 10.2, and a biomass degree (calculated value) of 82.8%. Further, the proportion of the polymer particles was 15.7 mass %.
(Polyoxyalkylene Polyol(A2))

A polyoxypropyleneoxyethylene polyol having an average number of hydroxy groups of 4 and a hydroxy value of 28 mgKOH/g, and containing 13 mass % of a polyoxyethylene group at its terminals.
(Polymer-Dispersed Polyol (A3))

A polymer-dispersed polyol obtained by copolymerizing acrylonitrile with styrene in the polyoxypropyleneoxyethylene polyol having an average number of hydroxy groups of 3 and a hydroxy value of 34 mgKOH/g, and containing 14.5 mass % of a polyoxyethylene group at its terminals. The polymer-dispersed polyol had a hydroxy value of 24 mgKOH/g, and the proportion of the polymer particles was 35 mass %.
(Crosslinking Agent 1)
Diethanolamine.
(Crosslinking Agent 2)
A polyoxypropyleneoxyethylene polyol having an average number of hydroxy groups of 6 and a hydroxy value of 445 mgKOH/g, and containing 28 mass % of a polyoxyethylene group at its terminals.
(Cell Opener)
A polyoxypropyleneoxyethylene polyol having an average number of hydroxy groups of 3 and a hydroxy value of 48 mgKOH/g, and obtained by random ring-opening polymerization of propylene oxide with ethylene oxide in a mass ratio of 20/80.
(Catalyst (C-1))
A 33% dipropylene glycol (DPG) solution of triethylenediamine (tradename: TEDA L33, manufactured by Tosoh Corporation).
(Catalyst (C-2))
A 70% DPG solution of bis-(2-dimethylaminoethyl)ether (tradename: TOYOCAT ET, manufactured by Tosoh Corporation).
(Foam Stabilizer)
A silicone type foam stabilizer (tradename: SF-2962, manufactured by Dow Corning Toray Co., Ltd.).
(Blowing Agent (D))
Water.
(Polyisocyanate (B))
A mixture of TDI-80 (a mixture of 2,4-TDI/2,6-TDI=80/20 (mass ratio)) and crude MDI in a mass ratio of 80/20 (tradename: CORONATE 1021, manufactured by Nippon Polyurethane Industry Co., Ltd.).

Examples 7 to 17

A polyol-containing mixture was prepared by mixing all materials except for the polyisocyanate (B) with a formulation as shown in Table 1. The polyol-containing mixture was adjusted to have a liquid temperature of 30±1° C. Separately, the polyisocyanate (B) was adjusted to have a liquid temperature of 25±1° C.

Then, to the polyol-containing mixture, the polyisocyanate (B) was added until the isocyanate index shown in Table 1, followed by stirring for 5 seconds by a high-speed mixer (3,000 rpm), and the mixture was immediately injected into a mold heated at 60° C. and sealed. As the mold, an aluminum mold having an inside dimension of 400 mm in length and width×100 mm in height, was used.

Then, after curing at 60° C. for 7 minutes, a flexible polyurethane foam was taken out from the mold. After crashing, the foam was left to stand in a room (temperature: 23° C. and relative humidity: 50%) for 24 hours, followed by evaluation of foam appearance, foam physical properties and vibration characteristics.

Crashing is a step in which after the flexible polyurethane foam is taken out from the mold, the foam is continuously compressed to 75% of the foam thickness.
(Foam Appearance)

The skin portion and the core portion of the foam were visually observed and evaluated by the following standard.
◯: No problem at all.
◯Δ: Very slight cell roughening observed.
Δ: Slight cell roughening observed.
ΔX: Cell roughening observed in a part.:
X: Cell roughening observed all around.
-: Collapse (squash) occurred.
(Foam Physical Properties)

As the foam physical properties, the overall density, the density at the core portion, the 25% hardness (ILD hardness), the air flow, the rebound resilience, the rebound resilience at the core portion, the tear strength, the tensile strength, the elongation, the dry set, the wet set and the hysteresis loss were evaluated.

Further, the density at the core portion and the rebound resilience at the core portion were measured by using a sample cut out in a size of 100 mm in length and width×50 mm in height from the center portion of the foam excluding the skin portion.

The overall density, the density at the core portion, the 25% hardness, the rebound resilience, the tear strength, the tensile strength, the elongation, the dry set, the wet set and the hysteresis loss were measured in accordance with JIS K6400 (1997 edition).

(Vibration Characteristics)

With respect to the vibration characteristics, the resonance frequency (unit: Hz), the transmissibility at resonance frequency (measurement of absolute displacement) and the transmissibility of 6 Hz were evaluated. The measurements were carried out in accordance with JASO B407-87. As conditions for measuring the vibration characteristics, Tekken type (load: 490 N) was used as a pressing platen, and the vibrational total amplitude was adjusted to be 5 mm.

The entire disclosure of Japanese Patent Application No. 2007-165014 filed on Jun. 22, 2007 including specification, claims, and summary is incorporated herein by reference in its entirety.

What is claimed is:

1. A polymer-dispersed polyol (A1) obtained by polymerizing a vinyl monomer in the presence of the the following polyoxyalkylene polyol (a2):

Polyol (a1) derived from a natural fat/oil: a polyol derived from a natural fat/oil, which is obtained by providing a natural fat/oil with hydroxy groups by chemical reaction, and which has a hydroxyl value of from 20 to 250 mgKOH/g and a molecular weight distribution of at least 1.2;

TABLE 1

| Formulation (part(s) by mass) | | Ex. 7 | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|---|---|
| Polyol (a1) derived from a natural fat/oil | | | | | | | | 22 | 30.4 | 38 | | |
| Polyoxyalkylene polyol (a2) | | 2.7 | | | | | 8 | | | | | |
| Polymer-dispersed polyol (A1-1) | | | | | | | 24.5 | | | | | |
| Polymer-dispersed polyol (A1-2) | | 24.5 | 38 | 47.2 | | | | | | | | |
| Polymer-dispersed polyol (A1-3) | | | | | 24.5 | 38 | | | | | | |
| Polymer-dispersed polyol (A1-5) | | | | | | | | | | | 27 | 27 |
| Polymer-dispersed polyol (A1-6) | | | | | | | | | | | | |
| Polyoxyalkylene polyol (A2) | | 72.8 | 62 | 52.8 | 72.8 | 62 | 67.5 | 64 | 47.9 | 35.1 | 45 | 45 |
| Polymer-dispersed polyol (A3) | | | | | | | | 14 | 21 | 26.9 | 28 | 28 |
| Crosslinking agent 1 | | 0.5 | 0.5 | 0.5 | 0.5 | 0.5 | 0.5 | 0.5 | 0.5 | 0.5 | 0.5 | 0.5 |
| Crosslinking agent 2 | | 1.5 | 1.5 | 1.5 | 1.5 | 1.5 | 1.5 | 1.5 | 1.5 | 1.5 | 1.5 | 1.5 |
| Cell opener | | 1 | 1 | 1 | 1 | 1 | 1 | 1 | 1 | 1 | 1 | 1 |
| Catalyst (C-1) | | 0.6 | 0.6 | 0.6 | 0.6 | 0.6 | 0.6 | 0.6 | 0.6 | 0.6 | 0.6 | 0.6 |
| Catalyst (C-2) | | 0.07 | 0.07 | 0.07 | 0.07 | 0.07 | 0.07 | 0.07 | 0.07 | 0.07 | 0.1 | 0.1 |
| Foam stabilizer | | 0.5 | 0.5 | 0.5 | 0.5 | 0.5 | 0.5 | 0.5 | 0.5 | 0.5 | 1.2 | 1.2 |
| Blowing agent (D) | | 3.2 | 3.2 | 3.2 | 3.2 | 3.2 | 3.2 | 3.2 | 3.2 | 3.2 | 3.0 | 3 |
| Polyisocyanate (B) (isocyanate index) | | 100 | 100 | 100 | 100 | 100 | 100 | 100 | 100 | 100 | 100 | 100 |
| Biomass degree (%) of foam | | 15 | 20 | 25 | 15 | 20 | 15 | 15 | 20 | 25 | 15 | 15 |
| Foam appearance | Skin portion | ○Δ | ○Δ | ΔX | ○Δ | ○Δ | ○Δ | ○Δ | X | — | ○Δ | ○Δ |
| | Core portion | ○ | ○ | Δ | ○ | ○ | ○ | ○ | X | — | ○ | ○ |
| Overall density (kg/cm³) | | 62.6 | 62.5 | 61.8 | 62.2 | 62.4 | 62.2 | 62.3 | 62.4 | | 59.1 | 59.3 |
| Density at the core portion (kg/cm³) | | 54.6 | 55.7 | 54.9 | 53.7 | 53.8 | 55.9 | 54.4 | | | 54.4 | 54.0 |
| ILD hardness (initial load: 0.5 kg) | Initial thickness (mm) | 98.4 | 98.3 | 98.5 | 98.2 | 97.8 | 98.1 | 98 | 98.1 | | 96.4 | 97.3 |
| | 25% (N/314 cm²) | 198 | 209 | 206 | 196 | 194 | 178 | 248 | 232 | | 225 | 226 |
| Air flow (L/min.) | Core portion | 66.75 | 37.00 | 25.00 | 67.50 | 54.00 | 65.75 | 45.50 | 74.25 | | 35.0 | 46.0 |
| Rebound resilience | Overall | 61 | 54 | 49 | 61 | 55 | 59 | 62 | 46 | | 56 | 56 |
| (%) | Core portion | 61 | 53 | 47 | 62 | 53 | 60 | 65 | 56 | | 63 | 63 |
| Tear strength (N/cm) | | 4.7 | 3.6 | 3.1 | 4.1 | 3.9 | 4.5 | 4.9 | 5.4 | | 6.5 | 6.4 |
| Tensile strength (kPa) | | 107.1 | 75.0 | 46.7 | 96.5 | 87.8 | 96.2 | 113.4 | 68.8 | | 175.7 | 166.7 |
| Elongation (%) | | 100 | 79 | 60 | 107 | 100 | 103 | 104 | 82 | | 109 | 109 |
| Dry set (%) | | 2.9 | 3.5 | 4.3 | 3.0 | 3.2 | 3.7 | 3.1 | 2.6 | | 3.1 | 3.7 |
| Wet set (%) | | 9.6 | 10.4 | 10.0 | 8.0 | 9.0 | 9.9 | 9.2 | 10.4 | | 10.8 | 10.4 |
| Hysteresis loss rate (%) | | 20.5 | 24.4 | 25.7 | 19.3 | 22.3 | 20.6 | 17.8 | 23.1 | | 22.7 | 22.2 |
| Vibration Characteristics | Resonance frequency (Hz) | 3.45 | 3.67 | 3.85 | 3.5 | 3.67 | 3.65 | 3.23 | 3.45 | | 3.70 | 3.78 |
| | Transmissibility at resonance frequency | 3.95 | 3.2 | 2.7 | 3.4 | 3.08 | 3.4 | 4.03 | 4.1 | | 3.32 | 3.74 |
| | Transmissibility of 6 Hz | 0.66 | 0.76 | 0.9 | 0.61 | 0.75 | 0.76 | 0.5 | 0.62 | | 0.66 | 0.66 |

The results in Table 1 show that each of the flexible polyurethane foams in Examples of the present invention maintains the foam physical properties and the decrease in its foam appearance is suppressed even with a higher biomass degree.

On the other hand, with respect to each of the flexible polyurethane foams in Comparative Examples, since the polymer-dispersed polyol of the present invention is not used, the foam appearance became bad when the biomass degree was 20%, and collapse occurred when the biomass degree was 25%.

INDUSTRIAL APPLICABILITY

The flexible polyurethane foam produced by the process of the present invention can be used for an interior material for a vehicle (such as sheet cushions, sheet backs, head rests or arm rests), an interior material for a railway vehicle, beddings, mattresses, cushions, etc.

Polyoxyalkylene polyol (a2): a polyoxyalkylene polyol which is produced by ring-opening polymerization of an alkylene oxide (c) with the polyol (a1) derived from a natural fat/oil in the presence of at least one polymerization catalyst (b) selected from the group consisting of a coordination anionic polymerization catalyst and a cationic polymerization catalyst wherein said polyol (a1) is obtained by providing a natural fat/oil having no hydroxyl groups with hydroxyl groups by chemical reaction.

2. The polymer-dispersed polyol according to claim 1, wherein the polyol (a1) derived from a natural fat/oil is one obtained by blowing air or oxygen in a natural fat/oil to cause oxidative cross linking between unsaturated double bonds of the natural fat/oil and at the same time, to have hydroxyl groups provided.

3. The polymer-dispersed polyol according to claim 1, wherein the polyol (a1) derived from a natural fat/oil is one obtained by deoxidizing unsaturated double bonds of a natural fat/oil by having an oxidizing agent acted thereto, followed by ring-opening in the presence of an active hydrogen compound to have hydroxyl groups provided.

4. The polymer-dispersed polyol according to claim 1, wherein the natural fat/oil has an iodine value of from 50 to 200.

5. The polymer-dispersed polyol according to claim 1, wherein the natural fat/oil is soybean oil.

6. The polymer-dispersed polyol according to claim 1, wherein the vinyl monomer contains acrylonitrile and styrene.

7. The polymer-dispersed polyol according to claim 1, wherein the polyoxyalkylene polyol (a2) has a hydroxyl value of from 15 to 250 mgKOH/g and a molecular weight distribution of from 1.2 to 20.

8. The polymer-dispersed polyol according to claim 1, wherein the polymerization catalyst (b) is a zinc hexacyanocobaltate complex having an organic ligand.

9. The polymer-dispersed polyol according to claim 1, wherein the alkylene oxide (c) is ethylene oxide and propylene oxide.

10. A process for producing a polymer-dispersed polyol, which comprises polymerizing a vinyl monomer in the presence of polyoxyalkylene polyol (a2):

Polyol (a1) derived from a natural fat/oil: a polyol derived from a natural fat/oil, which is obtained by providing a natural fat/oil with hydroxy groups by chemical reaction, and which has a hydroxyl value of from 20 to 250 mgKOH/g and a molecular weight distribution of at least 1.2;

Polyoxyalkylene polyol (a2): a polyoxyalkylene polyol which is produced by ring-opening polymerization of an alkylene oxide (c) with the polyol (a1) derived from a natural fat/oil in the presence of at least one polymerization catalyst (b) selected from the group consisting of a coordination anionic polymerization catalyst and a cationic polymerization catalyst.

11. A process for producing a flexible polyurethane foam, which comprises reacting a polyol (A) containing the polymer-dispersed polyol (A1) as defined in claim 1 and a polyisocyanate (B) in the presence of a catalyst (C) and a blowing agent (D).

12. The process for producing a flexible polyurethane foam according to claim 11, wherein the polyol (A) further comprises a polyoxyalkylene polyol (A2) having an average number of hydroxyl groups of from 2 to 8 and a hydroxyl value of from 20 to 160 mgKOH/g.

13. The process for producing a flexible polyurethane foam according to claim 11, wherein the polyol (A) further comprises the polyoxyalkylene polyol (a2).

14. The process for producing a flexible polyurethane foam according to claim 11, wherein foam-molding is carried out in a sealed mold.

15. The process for producing a flexible polyurethane foam according to claim 11, wherein the blowing agent (D) is water.

16. The process for producing a flexible polyurethane foam according to claim 11, wherein the polyol (A) further comprises a polyoxyalkylene polyol (A2) having an average number of hydroxyl groups of from 2 to 8 and a hydroxyl value of from 20 to 160 mgKOH/g and wherein a ratio of polymer-dispersed polyol (A1) to polyoxyalkylene polyol (A2) is from 10/90 to 90/10 (mass ratio).

* * * * *

UNITED STATES PATENT AND TRADEMARK OFFICE
CERTIFICATE OF CORRECTION

PATENT NO. : 8,642,668 B2  Page 1 of 1
APPLICATION NO. : 12/644043
DATED : February 4, 2014
INVENTOR(S) : Takayuki Sasaki et al.

It is certified that error appears in the above-identified patent and that said Letters Patent is hereby corrected as shown below:

On the title page, Item (63), the Related Application Data Information has been omitted. Item (63) should read:

--Related U.S. Application Data

(63) Continuation of application No. PCT/JP2008/061354, filed on Jun. 20, 2008--

Signed and Sealed this
Sixth Day of May, 2014

Michelle K. Lee
*Deputy Director of the United States Patent and Trademark Office*